Figure 1:
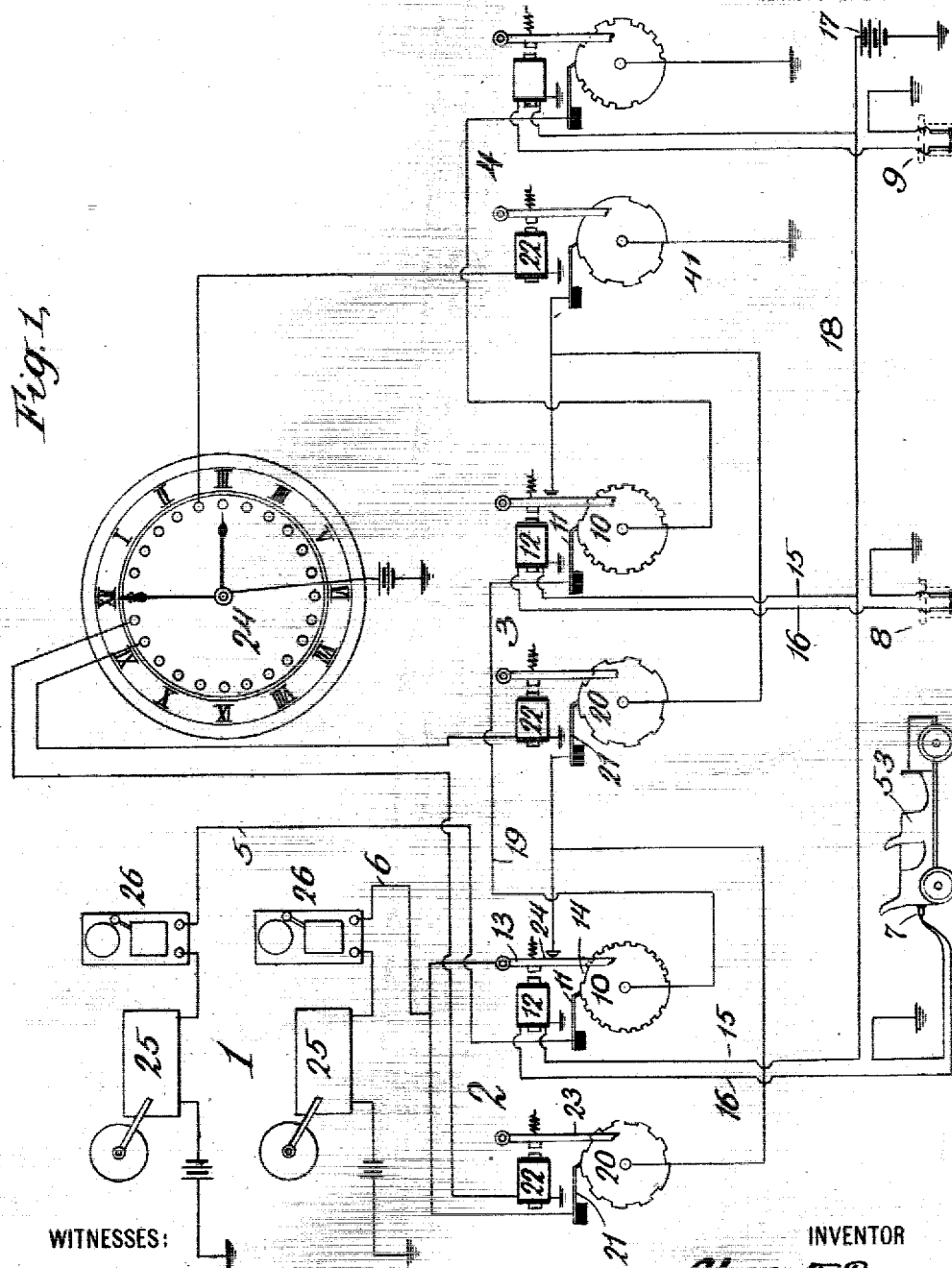

No. 852,344. PATENTED APR. 30, 1907.
C. F. PATTERSON.
SUPERVISORY SIGNAL SYSTEM.
APPLICATION FILED JUNE 14, 1906.
3 SHEETS—SHEET 1.

WITNESSES:
K. P. McElroy.
Alfred M. Houghton.

INVENTOR
Charles F. Patterson
BY
H. M. Marble
ATTORNEY.

No. 852,344.  
PATENTED APR. 30, 1907.

C. F. PATTERSON.  
SUPERVISORY SIGNAL SYSTEM.  
APPLICATION FILED JUNE 14, 1906.

3 SHEETS—SHEET 2.

WITNESSES:  
K. P. McElroy  
Alfred M. Houghton

INVENTOR  
Charles F. Patterson  
BY  
H. M. Marble  
ATTORNEY

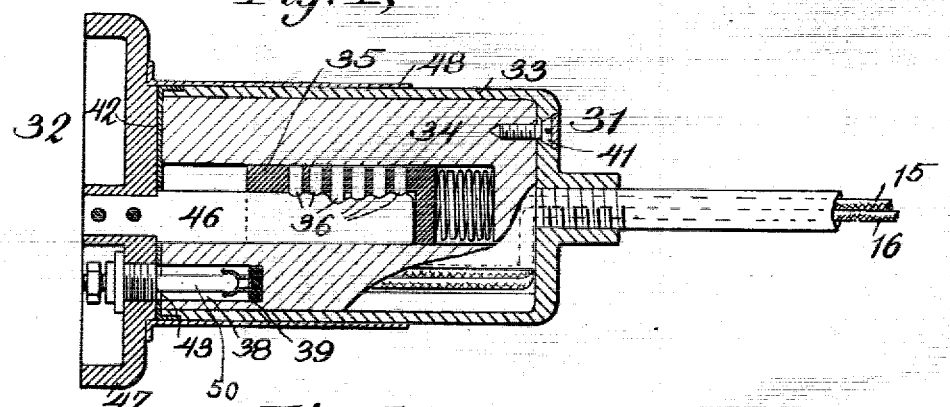
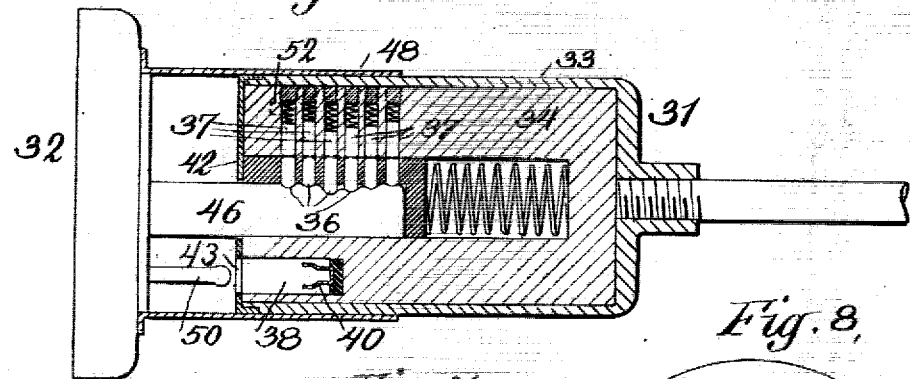
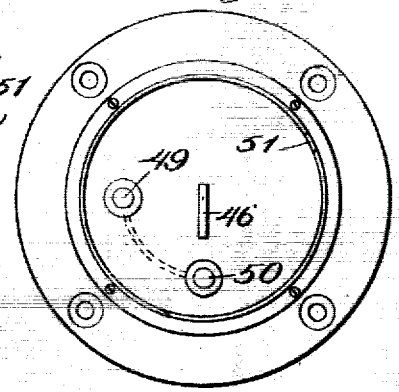
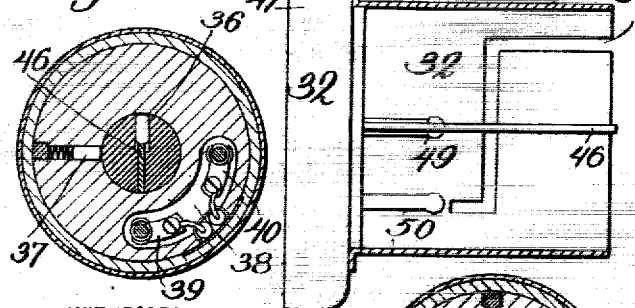
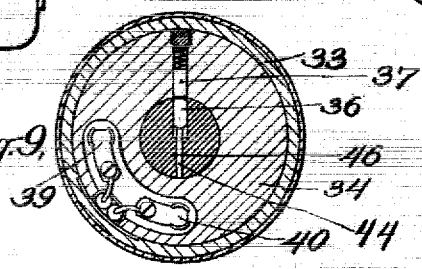

UNITED STATES PATENT OFFICE.

CHARLES F. PATTERSON, OF NEW YORK, N. Y.

SUPERVISORY SIGNAL SYSTEM.

No. 852,344.   Specification of Letters Patent.   Patented April 30, 1907.

Application filed June 14, 1906. Serial No. 321,725.

*To all whom it may concern:*

Be it known that I, CHARLES F. PATTERSON, a citizen of the United States, residing at New York, in the county of New York and State of New York, have invented a certain new and useful Supervisory Signal System; and I do hereby declare the following to be a full, clear, and exact description of the same, such as will enable others skilled in the art to which it appertains to make and use the same.

My invention relates to an electric supervisory signaling and indicating system designed to indicate and register the movements to and from their respective home stations, of each and all of a plurality of objects removable from such home stations, such as vehicles, horses, etc., and the approximate time of arrival and departure thereof.

My system comprises transmitting devices, one for each vehicle or other removable object to be supervised, with automatic means for causing the operation of each such transmitting device when its corresponding removable object leaves its home station and again when such object returns to its home station; and my system further comprises suitable indicating and recording devices, which may be, and customarily will be, located at a central station distinct from the home station of such removable objects, and suitable circuits connecting the transmitting devices with such central station indicating and recording apparatus.

A large number of transmitting devices may be connected by the same circuits to the same central station recording and indicating apparatus.

My invention is particularly suitable for use in connection with stables, automobile garages, and the like, where a large number of vehicles, horses, etc., belonging to different owners, are kept, and enables the owner of any such vehicle, horse, or other removable object to have automatically recorded the movements of the same from such home station, quite independent of the stable or garage records and by apparatus not under the control of the stable or garage employees.

The objects of my invention are to supervise the movements to and from their respective home stations, of vehicles, horses and other removable objects; to indicate automatically when, and at what time, each such vehicle or removable object departs from its particular home station, and when and at what time it is returned thereto; to make the apparatus simple, durable, reliable, and easily operated; to permit the use of a single indicating and recording set, and common circuits, for a large number of transmitting devices of the system; to prevent false manipulation or operation of the transmitting apparatus of the system; and to provide for the automatic periodic testing of the circuits and apparatus of the system.

I will now proceed to describe my invention with reference to the accompanying drawings, illustrating one arrangement of the circuits and apparatus for carrying out my invention, and will then point out the novel features in claims.

Figure 2:
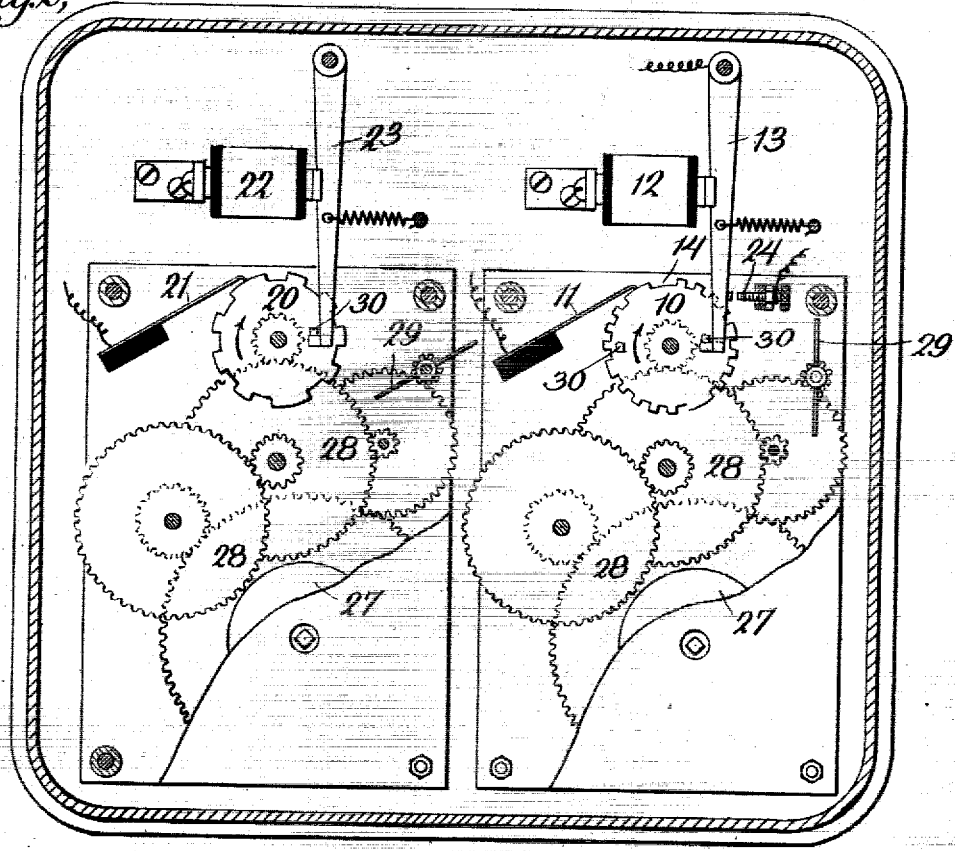
Figure 3:
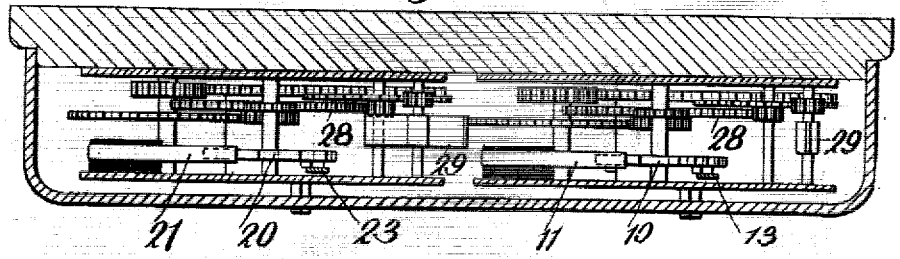

In the said drawings: Figure 1 shows diagrammatically the transmitting instruments, circuits and central station apparatus of a system embodying my invention. Fig. 2 shows a side view, with the cover of the inclosing case removed, of one of the transmitting instruments of my system. Fig. 3 shows a transverse section looking downward, of such transmitting instrument, the section being taken just below the operating magnets of the apparatus. Figs. 4—9 inclusive, are detail views of the automatic separable circuit controlling device of my system, comprising two relatively individualized co-acting members, by the separation or uniting of which the operation of the transmitting apparatus is caused. Fig. 4 showing a longitudinal section of the plug and socket fully connected; Fig. 5 showing a similar view with the plug in its first position; Fig. 6 showing a transverse section corresponding to Fig. 4; Fig. 7 showing a longitudinal section of the socket; Fig. 8 an end view thereof, and Fig. 9 a transverse section corresponding to Fig. 5.

Referring to the said drawings and at first to Fig. 1 thereof, 1 designates a central station at which the recording and indicating devices are located; 2, 3 and 4 designate transmitting apparatus, 5 and 6 designate main line circuit conductors connecting the central station apparatus with said transmitting apparatus, and 7, 8 and 9 designate separable circuit controlling devices, such as shown in Figs. 4—9 inclusive, for transmitting instruments 2, 3 and 4 respectively.

Each transmitting instrument of my system comprises two independent transmitting devices which may with advantage be of the general type employed in district messenger service, fire alarm service, and the like, comprising a toothed transmitting wheel and corresponding contact brush or "pen," said wheel toothed to transmit telegraphically a number or other code-character, characteristic of that particular transmitting instrument. Customarily, though not necessarily, both of the transmitting devices of each such transmitting instrument are arranged to send the same number or code designation, but to send the same over separate circuits. One of the transmitting devices of each such transmitting instrument is for transmitting periodically the signal of its particular box or transmitter through the line circuit 6 of the system; and these periodic signal transmitting devices are controlled by means, such as a time clock, which causes them to send in their respective signals in succession, at regular intervals. As hereinafter explained, if for any reason the vehicle or other removable object supervised by one of the boxes is away from its home station, the periodic transmitting device of such box is cut out so long as said removable object is away from its home station. The other said transmitting device of each transmitting instrument or box of the system is arranged to transmit over circuit 5, (which circuit may be termed the "alarm circuit" to distinguish it from circuit 6 which may be termed the "time circuit,") the number or code designation of that box, at the time of departure of the vehicle or other object supervised from its home station, and again at the time of return of such device to such home station; and customarily I so arrange the transmitting device that the latter alarm is accompanied by a further distinctive signal to indicate that it is a return signal and not a departure signal. In this way the central station attendant is apprised whenever any particular vehicle or like object supervised, departs from its home station, and when it returns thereto; and, proper record being made of such arrival and departure signals, the two records of the system perfectly check each other; likewise, the periodic operation of the apparatus of the time circuit shows clearly that the apparatus and circuits of the system are in operative condition.

Taking up now the detail description of the apparatus, and first of all the construction of the transmitting apparatus of box 2 for example (the mechanism of the other boxes may be the same), 10 designates the transmitting wheel for the alarm circuit, 11 the pen or contact brush therefor, 12 a controlling magnet for said wheel and 13 the armature lever for such magnet, controlling an escapement mechanism more fully shown in Figs. 2 and 3. To differentiate the departure and arrival signals from this transmitting device, I have shown this wheel provided with two series of notches, each comprising the number of the box, but the second including as well, a dash notch 14. The escapement mechanism is arranged to cause half a revolution of wheel 10 upon the departure of the vehicle supervised, and to cause a further half rotation of the wheel upon the return of such vehicle, the pen 11 encountering the dash notch 14 only near the conclusion of the second half revolution.

For present purposes the separable controlling devices 7, 8 and 9 etc., of the several boxes may be assumed to be devices which, when the vehicle supervised is at its home station, closes a local controlling circuit 15—16, passing through the magnet 12; current being supplied to this circuit by any convenient means, as for example, a battery 17 and current lead 18, which may be common to all the transmitting devices or any convenient number thereof. When this controlling circuit 15—16 is broken upon the departure of the vehicle supervised by box 2 and the consequent operation of the controlling device 7, magnet 12 is deënergized, the escapement mechanism of wheel 10 is operated and said wheel permitted to revolve one half revolution. Upon the closing of said circuit 15—16, at device 7, magnet 12 is energized, the escapement mechanism of the wheel 10 is again operated and said wheel is permitted to revolve back to its starting point, in so doing sending the number of the box together with a dash. The line circuit 5 passes from brush 11 through wheel 10 and conductor 19 to the brush 11 of the next box, and so on, the alarm signal transmitting devices of the several boxes being therefore connected in series in a normally closed circuit.

The time circuit signaling device of the several boxes, comprise each a toothed contact wheel 20 with pen or contact brush 21, and are each controlled by a magnet 22 and an armature lever 23 operating release mechanism. A time clock 24 controls the magnets 22 of a series of boxes and periodically energizes the magnets 22 of such series in succession. I do not limit myself to any particular type of time clock contact device, but may use any such device suitable for the purpose. In the drawings I have indicated said time clock as provided on its dial with a circular series of contact points over which the minute hand of the clock, acting as a brush or "wiper," sweeps successively. Circuits radiate from the various contact points on the dial to the several magnets 22. As the minute hand rotates therefore, the several magnets 22 are energized successively, each for an instant only, but for long enough to release the corresponding contact wheel and permit rotation of the same to begin; said wheel continuing to rotate until its revolution is completed, when it is arrested automatically by the detent arm 23. If the object supervised by any one of these transmitting boxes is at its home station when the time circuit wheel 20 of that box is caused to rotate as described, the signal of that box will be transmitted through circuit 6 and recorded at the central station. But if the object supervised by such box is not at its home station when the contact wheel 20 of that box rotates as described, the rotation of said wheel will be ineffective owing to the fact that, magnet 12 being deënergized, arm 13 has closed a shunt circuit contact 24 by which the wheel 20 and pen 21 of that box are shunted with respect to the line circuit, so that no interruption of line circuit 6 is caused by their operation. So long as the object supervised is away from its home station therefore, the periodic signals will not be received from the corresponding transmitting device.

At the central station each of circuits 5 and 6 has its own register 25 and bell or other audible signaling device 26.

In Figs. 2 and 3 I have shown the mechanism of one of the transmitting boxes, the same numerals being employed as in Fig. 1. For rotating the toothed contact wheels I have shown normally-wound spring motors 27, driving the contact wheels through customary gear-trains 28, the speed of rotation being controlled by fans 29. The armature levers 11 and 21 may control the rotation of the contact wheels by means of any suitable detent or escapement device. In the construction shown, these detent or escapement devices are very simple, consisting merely of pins 30 on the contact wheels, arranged to be engaged by the ends of the armature levers 13 and 23 respectively. Since wheel 10 is to rotate only half a revolution each time it operates, (once when magnet 10 is deënergized, and again when magnet 10 is reënergized,) said wheel is provided with two pins 30, placed at different radial distances, so that when said magnet is deënergized and its armature lever, flying out, releases one pin 30, it is in position to engage the other pin 30 when the half revolution of the contact wheel is complete; and similarly, when the magnet 10 is again energized and its lever 13 releases that pin 30, it moves into position to engage the other pin 30. It is intended that the minute hand of the time clock 24 (Fig. 1) or other contact device with which said clock may be provided, will be in contact with each contact point of the series for less time than it takes the contact wheels 20 of the corresponding transmitter boxes to rotate, so that each armature lever 23, after releasing the pin 30 of its contact wheel 20, will be back again to engage and arrest the pin 30 upon the completion of the rotation of such contact wheel.

I do not confine myself to any particular contact device for the local controlling circuits 15—16 of the transmitter boxes, but may employ that shown in Figs. 4—9 inclusive, which forms the subject-matter of a separate application for Letters Patent. It is desirable that the contact device employed shall comprise two separable coacting members, one adapted for connection to the vehicle or other movable object to be supervised, the other for connection to the conductors of circuits 15—16, the two members relatively individualized so that each may be used only with the other. This is exceedingly important, in order that the transmitter for each vehicle may be operated only when that particular vehicle is taken out or returned, and in order that it may be impossible to falsely indicate at the central station the return of a vehicle, by the application of a dummy member to the circuit-terminal member of the corresponding contact device. The contact device shown in Figs. 4—9 fulfils these requirements, being provided with tumbler mechanism much like that of so-called "Yale" locks, serving to individualize the members of one contact device from those of any desired number of similar contact devices.

In Figs. 4—9 inclusive, 31 designates the plug member of the device, forming the terminal member for conductors 15 and 16 of Fig. 1, and 32 designates the socket for receiving said plug. Said plug comprises an outer shell 33, preferably of strong metal, an intermediate member 34, fitting within said shell, and an inner member 35, rotatable somewhat with respect to members 33 and 34, and carrying within it a series of plug-shaped tumblers, 36, of varying length, adapted to coact with similar tumblers 37, mounted in cells in member 34, and spring-actuated, as shown. Members 33 and 34 inclose between them a chamber 38, containing terminal clips 39 and 40 for conductors 15 and 16 respectively, and said members 33 and 34 are separable for convenience in wiring the plug, said members being rigidly connected, once the wires have been connected, by suitable means, as for example by screws 41 having their heads sealed over.

The tumbler-barrel 35, has secured to it a gate, 42, normally closing the end of member 34 and preventing access to the circuit terminals 39 and 40; but this gate has in it an opening 43, which may be brought into registry with chamber 38 by inserting into the slot 44 of the tumbler barrel 35 a suitable key which will line up all of the tumblers 36 and 37 with their adjacent faces just at the dividing line between members 34 and 35. The socket member 32 comprises such a key, 46, secured to the recessed base 47 of the socket member, and protected by the tubular shell 48 into which the plug 31 fits. The operation of this contact device is as follows: Supposing plug 31 and socket 32 to be separated, to connect them the plug is introduced into the socket, the key 46 fitting within the slot 44. The socket is pressed in straight as far as it will go—i. e., until the key is fully home. If the socket and plug correspond, the tumblers of the plug will now all be lined up as shown in Fig. 5, with their adjacent faces just at the parting between the tumbler barrel 35 and member 34. The plug may now be rotated a few degrees, the tumbler barrel 35 being held stationary by key 46, which has the effect of moving the orifice 43 in gate 42 into line with chamber 38. After which the plug may be pressed in still farther; tumbler-barrel 35 retreating back into member 34; and this final movement of the plug 31 brings contact fingers 49 and 50 into contact with terminal clips 39 and 40. These fingers 49 and 50 being in electrical connection, as shown in Fig. 8, wires 15 and 16 are now in connection, and circuit 15—16 is closed.

To disengage the plug 31 from socket 32, the operations above described are reversed, whereupon the tumbler-barrel 35 is pressed out by its spring 45, the gate 42 closes contact chamber 38, the tumblers 37 come opposite the corresponding tumblers 36; and, as the plug is withdrawn completely, said tumblers 37, being pressed outward, enter to a greater or less extent the barrel 35, preventing rotation thereof.

It will be seen that when the plug is removed from its socket, the circuit terminals are entirely sealed against access; nor can the contact chamber be opened except by means of a key corresponding to the key of the particular socket to which the plug corresponds.

As is well known, the permutations possible by varying the length of the tumblers of a locking mechanism such as shown are almost without limit; likewise such mechanisms may be installed in groups and sub-groups, adjusted to have a master-key for the entire group and individual master-keys for the different sub-groups, the same as is now done with locks. This greatly facilitates the work of inspectors, each of whom may have a master key for the particular group or sub-group in his charge. The keys 46 are so inclosed by the shells 48 of the socket-members, that it is difficult to obtain access to said keys to take impressions therefrom, and an attempt to take such an impression is almost sure to be detected.

In the case of vehicles, it is contemplated that the socket members 32 shall be permanently secured to some convenient portion of the vehicle, it being necessary, therefore, to detach the plug 31 from its socket 32, before the vehicle can be taken away from its home station. 53, in Fig. 1, designates a vehicle having a socket so attached. The plug may be connected to its transmitting box by flexible conductors 15 and 16 of such length as to permit the vehicle to be moved somewhat, as for cleaning and inspection, without disconnecting the plug from its socket.

In the case of horses or other animals, the socket 32 may be secured permanently to a halter or collar or harness locked on the animal.

The shells 48 of the sockets 32 are provided with bayonet-grooves 51 adapted to receive projections 52 on the plugs 31, whereby the correct rotation of the plug in its socket is insured.

The operation of the system is as follows: Supposing the object supervised to be at its home station, the clock 24 causes the time-circuit wheel 20 of the corresponding box to rotate, periodically, sending in its characteristic signal in so doing. The time-signal mechanisms of the several boxes are operated successively, so that there can be no clash between the signals of different boxes. If the object supervised is removed, the controlling circuit 15—16 of the corresponding transmitting box is interrupted, the magnet 12 of that box deënergized, and the wheel 10 caused to rotate a half revolution, sending in the number of that box over the alarm circuit; and the time-circuit is shunted through that particular box, so that the number of that box cannot be sent in over the time circuit so long as the object supervised is absent. Upon the return of such object circuit 15—16 is closed, magnet 12 again energized, wheel 10 completes its rotation, sending in the number of the box with the additional dash character to denote that it is a return signal, and the shunt-connection of the time circuit through that box is broken, so that thereafter the time signals are sent in periodically until said object supervised is again removed.

What I claim is:—

1. The combination with a supervisory signal system comprising receiving means, circuits, and a plurality of transmitters comprising transmitting mechanism, a periodic controller therefor, and other independent controlling means, of a plurality of objects to be supervised, removable with respect to said transmitters and provided with means whereby said independent controlling device of each transmitter is operated when the corresponding object to be supervised is removed and again when the same is returned.

2. The combination with a supervisory signal system comprising receiving means, circuits, and a plurality of transmitters comprising transmitting mechanism, a periodic controller therefor, and other independent controlling means, of a plurality of objects to be supervised, removable with respect to said transmitters and provided with means whereby said independent controlling device of each transmitter is operated when the corresponding object to be supervised is removed and again when the same is returned, said transmitting means each comprising means preventing transmission of the periodic signals during the absence of the corresponding object to be supervised.

3. In a supervisory signaling system, the combination of transmitters, one for each object supervised comprising alarm-circuit and time-circuit transmitting devices, means operated by one of said transmitting devices for cutting out the other such transmitting device, and controlling means comprising separable members, one connected to said transmitting means and the other adapted for connection to an object to be supervised.

4. In a supervisory signaling system, the combination of a series of transmitting means each comprising alarm-circuit and time-circuit transmitting devices, a time-controlled operating device for a group of such time-circuit transmitting devices operatively connected thereto and arranged to cause the same to operate in rotation, controlling means for said alarm-circuit transmitting devices arranged to operate the latter upon the departure of the object to be supervised and again upon the return of the latter, and means for cutting out the time signals of each transmitter during the absence of the corresponding object to be supervised.

5. In a supervisory signaling system, the combination of a plurality of transmitters, one for each object supervised, comprising alarm-circuit and time-circuit transmitting devices, each comprising a controlling magnet, an armature operated thereby, and means controlled by said armature controlling the operation of the corresponding transmitting device, a main controller for causing said time-circuit magnets to operate periodically in rotation, controlling means for the alarm-circuit transmitting device of each such transmitter and electrical contact means operated by the armature of each alarm-circuit transmitting device and arranged to cut out the corresponding time-circuit transmitting device in one position of the armature of said alarm-circuit device.

6. In a supervisory signaling system, the combination with two line circuits, and signal receiving means connected thereto, of a plurality of transmitters, one for each object supervised, each such transmitter comprising means for transmitting signals periodically through one of said circuits and means for transmitting signals through the other of said circuits when specially operated to that end, and controlling means for each such transmitter arranged to be operated automatically upon departure and return of the object supervised.

7. In a supervisory signaling system, the combination with two line circuits, and signal receiving means connected thereto, of a plurality of transmitters, one for each object supervised, each such transmitter comprising means for transmitting signals periodically through one of said circuits and means for transmitting signals through the other of said circuits when specially operated to that end, and controlling means for each such transmitter arranged to be operated automatically upon departure and return of the object supervised, said transmitters each comprising means for cutting out the periodic signals during absence of the object supervised.

8. In a supervisory signaling system, the combination with two line circuits, and signal receiving means connected thereto, of a plurality of transmitters, one for each object supervised, each such transmitter comprising means for transmitting signals periodically through one of said circuits and means for transmitting signals through the other of said circuits when specially operated to that end, controlling means for each such transmitter arranged to be operated automatically upon departure and return of the object supervised, and a periodic controller controlling the transmission of periodic signals by said transmitters and arranged to cause the same to be transmitted by the several transmitters successively.

9. In a supervisory signaling system, the combination with two line circuits, and signal receiving means connected thereto, of a plurality of transmitters, one for each object supervised, each such transmitter comprising means for transmitting signals periodically through one of said circuits and means for transmitting signals through the other of said circuits when specially operated to that end, controlling means for each such transmitter arranged to be operated automatically upon departure and return of the object supervised, a periodic controller controlling the transmission of periodic signals by said transmitters and arranged to cause the same to be transmitted by the several transmitters successively, and means for shunting the periodic transmitting devices of each transmitter during absence of the object supervised.

In testimony whereof I affix my signature, in the presence of two witnesses:

CHARLES F. PATTERSON.

Witnesses:
C. W. CONKLIN,
H. M. MARBLE.